United States Patent [19]
Gross et al.

[11] 3,833,054
[45] Sept. 3, 1974

[54] RADIATOR OF THERMOPLASTIC MATERIAL

[75] Inventors: Erwin Gross, Burgsolms; Michael Rudbach, Hofheim/Taunus; Hans Vowinkel, Florsheim am Main, all of Germany

[73] Assignee: Farbwerke Hoechst Aktiengesellschaft vormals Meister Lucuis & Bruning, Frankfurt am Main, Germany

[22] Filed: May 2, 1973

[21] Appl. No.: 356,468

[30] Foreign Application Priority Data
May 5, 1972 Germany............................ 2221971

[52] U.S. Cl...................... 165/67, 138/172, 237/70, 248/201, 248/233
[51] Int. Cl............................................... F28f 9/26
[58] Field of Search ......... 165/130, 175; 248/227.1, 248/233, 201; 237/70, 71, 73; 138/DIG. 4, 172, 173

[56] References Cited
UNITED STATES PATENTS

| | | | |
|---|---|---|---|
| 940,173 | 11/1909 | Mace | 138/172 |
| 1,190,955 | 7/1916 | Safford | 237/70 |
| 2,675,832 | 4/1954 | Hamilton | 138/172 |
| 2,758,612 | 8/1956 | Zaleski | 138/172 |
| 3,239,000 | 3/1966 | Meagher | 165/175 |
| 3,426,841 | 2/1969 | Johnson | 165/178 |
| 3,689,972 | 9/1972 | Mosier et al. | 165/175 |

Primary Examiner—William E. Wayner
Assistant Examiner—W. E. Tapolcai, Jr.
Attorney, Agent, or Firm—Curtis, Morris & Safford

[57] ABSTRACT

A radiator of thermoplastic material having horizontal and vertical water channels is provided wherein narrow stiffening corrugations are molded at least in the back wall of the horizontal water channels and connected with the opposite wall, the corrugations containing holding elements for fixing the radiator at the wall of the building.

8 Claims, 3 Drawing Figures

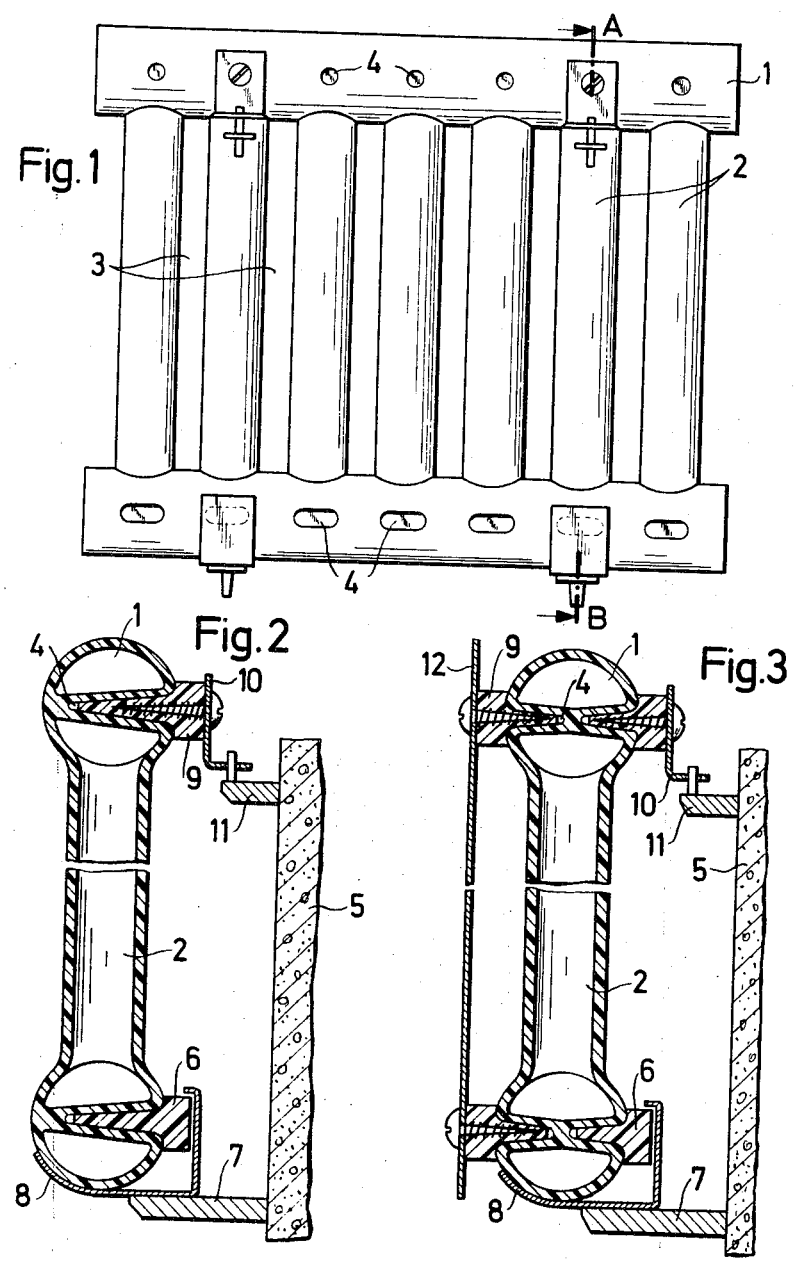

RADIATOR OF THERMOPLASTIC MATERIAL

Radiators of thermoplastic material having horizontal and vertical water channels can be manufactured by very different processes. It has been proposed to produce the parts by compression, extrusion, injection molding, blow molding or an analogous process.

With such radiators special care has to be taken that weak points which may appear due to manufacturing, especially in the horizontal water channels, are able to withstand too high internal pressures. Another characteristic of the plastic radiators is that they expand to a rather high degree in all dimensions when heated. Thus, it is not possible, as in the case of the usual radiators of cast iron or steel, to provide rigid connecting elements in order to fasten the radiator on the walls. On the contrary, the connecting elements must allow the radiator to move on account of the change of temperature.

Different measures have already been proposed to withstand the high internal pressures. Thus, it is known for example that in the case of steel radiators the parts particularly liable to high internal pressures are stiffened by corrugations. These corrugations are generally pressed in from both sides of the steel plates to about the middle and are connected with one another at the bottom. This measure provides a good stiffness. However, since the properties of the steel have to be taken into account when pressing in the stiffening corrugations, they have a rather large cross-section, which impairs the flow of the heating water in the water channels. Furthermore, the stiffening corrugations impair the appearance of the radiators.

Plastic materials have completely different properties from steel. Thus, it is possible for example to produce indentations which with regard to the depth and the small diameter thereof cannot be achieved with steel. A particularly favourable process for manufacturing these indentations is the blow molding process.

The object of the present invention consists in manufacturing a plastic radiator which, on the one hand, has a high resistance to the internal pressures and which, on the other hand, can be easily fixed at the wall of the building, while taking into account the expansion of the radiator.

This problem is resolved according to the invention by molding narrow corrugations at least in the back wall of the horizontal water channels and connecting them with the opposite wall of the water channels and by inserting holding elements into the corrugations to fasten the radiator.

In contradistinction to the stiffening corrugations known hitherto, these narrow corrugations according to the invention hardly impair the flow of the water, since only a very small part of the cross-section of the flow channel is lost. Moreover, the corrugations can influence the flow of the water in the desired way; for example it is possible to mold them in central position on the axis of the vertical channels or before or behind this axis. Inclined or bent stiffening corrugations, which could not be manufactured with the usual processes, make possible a directed water circulation in the radiator. In order to insure that the heating water also reaches the back part of the radiator, it is possible for example to cover partly by stiffening corrugations the flow apertures of the vertical water channels in the front part. Another important advantage is that the narrow and deep stiffening corrugations receive the holding elements for fastening the radiator. This has not been possible with the known stiffening corrugations having a rather large surface area. The holding elements expediently consist of stoppers which are blocked by a clamp permitting the radiator to expand and connected with a support. Stoppers similar to expanding plugs to screw on a fastening angle movably mounted on a support are also possible. The clamping of the stopper in the stiffening corrugation is obtained by the expanding effect of a screw.

The stiffening corrugations can be molded either only in the back wall of the radiator or in both sides at opposite places of the water channels. In the latter case both corrugations are connected with one another at the bottom. The front corrugations may be closed by special stoppers or serve for attaching tailpieces.

If necessary, the corrugations may be molded without any difficulty in the vertical water channels.

The invention will now be described in further detail, by way of example, with reference to the accompanying drawing in which:

FIG. 1 is a radiator with connecting elements in the back view

FIGS. 2 and 3 are possible cross-sections according to A – B of FIG. 1

The radiator consists of the horizontal water channels 1 and the vertical water channels 2. The interspaces 3 between the vertical water channels 2 may be either open or closed by small webs. Narrow deep stiffening corrugations 4 are molded in the horizontal water channels 1; they either reach to the opposite inner wall and are connected therewith or they are molded in from both sides and connected with one another at the bottom. Such narrow stiffening corrugations can be manufactured without any difficulty by the blow molding process with different cross-sections, for example round or oval. They hardly impair the flow of the water and they serve for strengthening the weak points.

To fix the radiator to the wall of the building 5, stoppers 6 are inserted into stiffening corrugations 4 and blocked by clamps 8 clamped on corresponding supports 7. The clamps 8 allow a certain expansion in longitudinal direction. Fastening angles 10 movably mounted on supports 11 to allow an expansion in all directions may be screwed on plug-like stoppers 9.

According to FIG. 3 a tailpiece 12 is attached in the corrugations 4 at the front side by means of plug-like stoppers 9. Alternatively the stiffening corrugations 4 at the front wall may be covered by locking plugs.

What is claimed is:

1. A radiator formed of a thermoplastic material, consisting of horizontal and vertical water channels in fluid communication with each other, said horizontal channels having front and back walls, and a plurality of narrow stiffening corrugations molded in at least the back wall thereof and integrally connected with the opposite wall of the water channels, and holding means for attaching the radiator to the wall of a building being inserted in said corrugations.

2. The radiator as defined in claim 1, wherein the stiffening corrugations are respectively molded in central positions on the axis of the vertical wall channels.

3. The radiator as defined in claim 1, wherein said front wall of said horizontal channels have stiffening corrugations formed therein located to to partly cover the flow apertures of the vertical water channels to improve the water distribution throughout the radiator.

4. The radiator as defined in claim 1, wherein said holding means consist of stoppers inserted into the stiffening corrugations and locking clamps placed over the stopper.

5. The radiator as defined in claim 1, wherein said holding means consist of expanding plugs inserted in the corrugations and screwed on fastening angles.

6. The radiator as defined in claim 1, wherein stiffening corrugations are molded in the front wall and have take up holding means mounted therein for securing a tail piece to said radiator.

7. The radiator as defined in claim 1, including stiffening corrugations molded in the front wall having locking plugs inserted therein.

8. A radiator formed of a thermoplastic material, consisting of horizontal and vertical water channels in fluid communication with each other said horizontal channels having front and back walls and a plurality of narrow stiffening corrugations molded therein, said stiffening corrugations being molded in from both said front and rear walls at opposite positions in said water channels and having adjacent bottom portions integrally connected with one another.

* * * * *

UNITED STATES PATENT OFFICE
CERTIFICATE OF CORRECTION

Patent No. 3,833,054     Dated September 9, 1974

Inventor(s) Gross et al.

It is certified that error appears in the above-identified patent and that said Letters Patent are hereby corrected as shown below:

In the Heading (Item 30):

After "Germany" and before " 2221971," insert -- P --.

Signed and sealed this 19th day of November 1974.

(SEAL)
Attest:

McCOY M. GIBSON JR.
Attesting Officer

C. MARSHALL DANN
Commissioner of Patents